United States Patent [19]
de la Llave et al.

[11] Patent Number: 5,975,585
[45] Date of Patent: Nov. 2, 1999

[54] PIPE COUPLING DEVICE

[75] Inventors: Claude de la Llave, La Rochelle, France; Anders Ström, Värnamo, Sweden

[73] Assignee: Forsheda AB, Forsheda, Sweden

[21] Appl. No.: 08/955,981

[22] Filed: Oct. 22, 1997

[30] Foreign Application Priority Data

Nov. 29, 1996 [SE] Sweden .................................. 9604416

[51] Int. Cl.$^6$ .................................................... F16L 35/00
[52] U.S. Cl. ................................ 285/3; 285/4; 285/139.2; 285/906
[58] Field of Search ............................. 285/136.1, 137.1, 285/138.1, 139.1, 139.2, 139.3, 140.1, 141.1, 142.1, 143.1, 3, 383, 23, 205, 22, 4, 1, 2, 906

[56] References Cited

U.S. PATENT DOCUMENTS

| | | | |
|---|---|---|---|
| 931,296 | 8/1909 | Hammon ........................................ | 285/3 |
| 1,182,710 | 5/1916 | Rowell ............................... | 285/136.1 X |
| 1,933,117 | 10/1933 | Markle .................................. | 285/383 X |
| 1,978,958 | 10/1934 | Robinson ........................... | 285/139.1 X |
| 1,981,247 | 11/1934 | Pope ..................................... | 285/136.1 X |
| 2,105,747 | 1/1938 | Martin et al. ......................... | 285/383 X |
| 4,607,664 | 8/1986 | Carney et al. ............................ | 285/3 X |
| 4,902,043 | 2/1990 | Zillig .......................................... | 285/4 |

FOREIGN PATENT DOCUMENTS 1440713  6/1976  United Kingdom ....................... 284/4

Primary Examiner—Dave W. Arola
Attorney, Agent, or Firm—Baker & Daniels

[57] ABSTRACT

A device in a pipe coupling between a pipe end portion and a wall surrounding the pipe end coupling which is constituted by a socket, consists of a stop face device which is fixable in axial directions in relation to the surrounding wall and engages an end surface of the pipe end portion so as to define the final, fully seated position of the pipe end portion in relation to a surrounding wall of the socket when the pipe end portion is introduced therein. The stop face device becomes inactivatable subsequently to defining the position of the pipe end portion in the surrounding wall. The stop face device consists of one of four inactivatable structures including: the stop face device comprising a breakable material that breaks under the influence of an axially directed force exerted by the pipe end portion when the pipe moves during use, a stop face device comprising a flexible material that folds away under the influence of an axially directed force exerted by the pipe end portion when the pipe moves during use, a stop face device comprising a degradable material that degrades by the influence of medium flowing through the pipe, or by the stop face device being demountable, subsequent to defining the final, fully seated position of the pipe end portion.

17 Claims, 4 Drawing Sheets

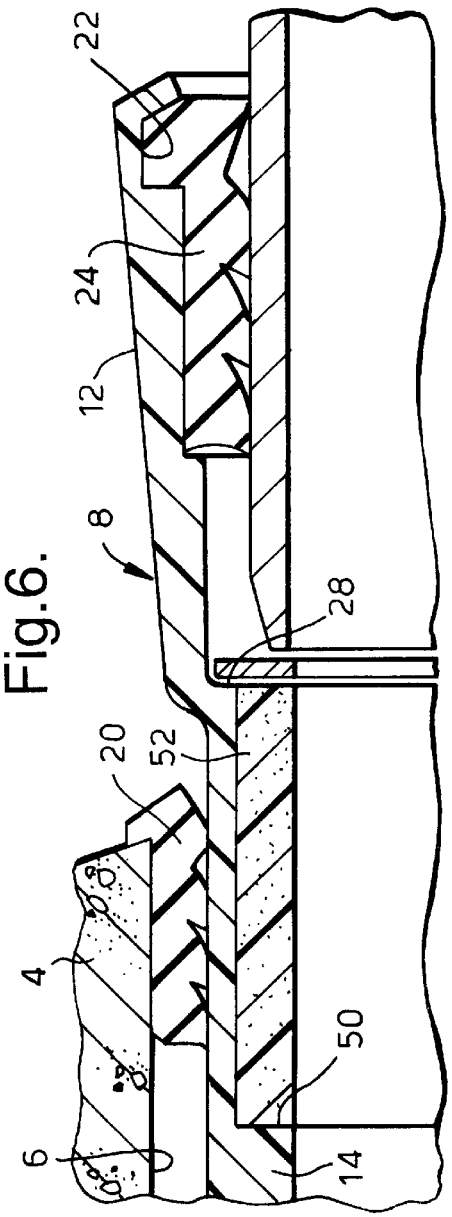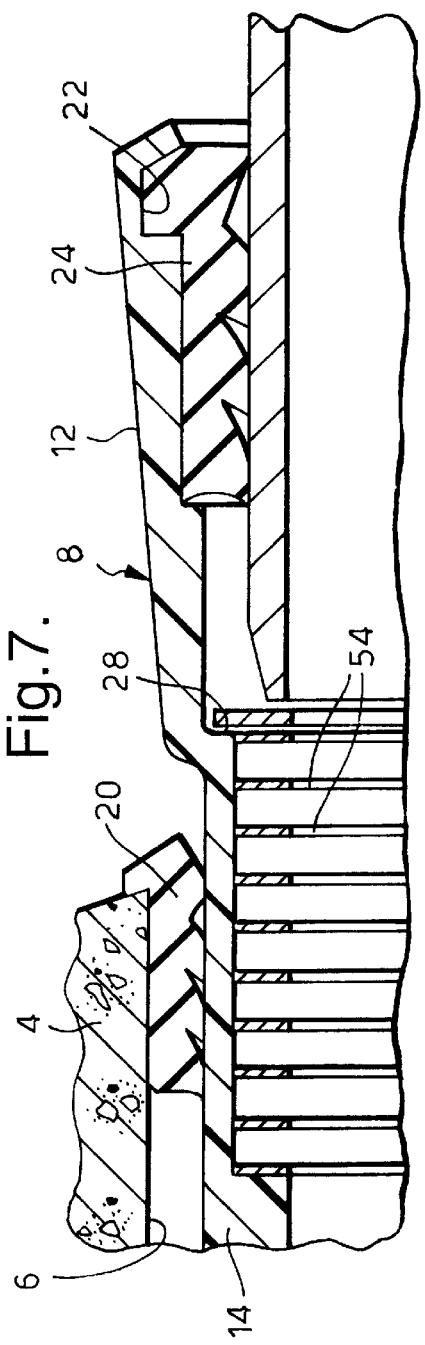

PIPE COUPLING DEVICE

The present invention relates to a device in a pipe coupling between a pipe end portion and a wall surrounding the pipe end portion and being constituted by for example a socket.

When connecting a pipe to another pipe, to a manhole or to any other kind of device there is used a pipe coupling which is established between an end portion of the pipe and a wall surrounding the pipe end portion and being constituted by for example a socket, the sealing between the pipe end portion and the surrounding wall being provided by positioning a sealing material, for example a sealing ring, in the annular space between the outer surface of the pipe end portion and the inner surface of the surrounding wall. A pipe coupling of this kind can be provided at a connection between the pipe and a manhole, the pipe being connected with a bore formed in the manhole wall by means of a sleeve-shaped socket which is introduced into the bore in the manhole wall and is sealed in relation thereto and into which the pipe end portion is introduced and sealed. Especially in pipe couplings of the last mentioned kind it is important to provide in the axial direction a correct relative position between the pipe end portion and the wall when the pipe end portion is introduced into the surrounding wall. The correct position is required so as to provide that the pipe end portion shall engage the sealing element positioned between the pipe end portion and the surrounding wall in a correct way without being introduced to far into the surrounding wall. In order to define the position of the pipe end portion in relation to the surrounding wall in the axial direction there is used a stop face device which is fixable in relation to the surrounding wall in the axial direction and is adapted to engage the end surface of the pipe end portion when this is introduced into the surrounding wall, said stop face device being for example constituted by an annular element.

However, the previously known stop face devices of the kind described above have the drawback of preventing movements between the end portion of the pipe and the wall surrounding the pipe. Such movements are necessary as a consequence of ground movements if the pipe line shall not be damaged. This is important especially when connecting a pipe line with a manhole when the manhole and the pipe line are positioned in a ground which is instable and is subjected to movements as a consequence of influences from traffic, earthquakes, erosion and the like. In such a ground the manhole is positioned in a stable way and if the pipe line is thereby rigidly connected with the manhole the pipe line will be injured if it is subjected to influences from the moving, surrounding ground and can not move in relation to the fixedly positioned manhole.

The object of the invention is to provide a stop face device in a pipe coupling of the kind described wherein the pipe end portion is in spite of the use of a stop face device for defining the mounting position of the pipe end portion in relation to the surrounding wall not prevented from moving in relation to the surrounding wall to a necessary extent for preventing damages to the pipe line.

In order to comply with this object the device according to the invention is characterized in that the stop face device is adapted to be inactivated subsequently to the use of the stop face device when the pipe end portion is introduced into the surrounding wall.

The stop face device according to the invention can be adapted to be inactivated under the influence of an axially directed force exerted on the stop face device by the pipe end portion, said force being greater than the force exerted onto the stop face device when using the stop face device for defining the position of the pipe end portion in the surrounding wall when the pipe end portion is introduced therein. The inactivation of the stop face device under the influence of an axially directed force exerted onto the stop face device by the pipe end portion can be provided by the fact that the stop face device is partially destroyed when said force is exerted by the fact that the stop face device is formed with indications of fracture or consists of a brittle or easily fracturable material. Thus, the stop face device can consist of a plastic material, for example polyvinyl chloride, provided with indications of fracture, or a brittle or easily fracturable material, for example cellular plastic. It is also possible to manufacture the stop face device from any kind of flexible material which resists the force from the pipe end portion when this is introduced into the surrounding wall so as to define the position of the pipe end portion but is folded away when it is subjected to a greater force from the pipe end portion caused by ground movements.

It is also possible to manufacture the stop face device from a degradable material, i.e. a material which is degraded for example under the influence of the medium floating through the pipe coupling. Such a degradable material can for example be constituted by some kind of material based on cellulose, for example cardboard.

It is possible also to arrange the stop face device in a dismountable way so that the stop face device can subsequently to having been used as a stop face device for defining the position of the pipe end portion be removed from its position in the surrounding wall. For example the stop face device can be constituted by an elastic or flexible material of annular shape. It is thereby possible to remove the stop face device by providing the device with a string or the like by means of which the stop face device is drawn out from the surrounding wall subsequently to the use of the device for defining the position of the pipe end portion.

The stop face device can be of annular shape in such a way that the engagement of the stop face device with the surrounding wall as well as with the pipe end portion is provided by means of annular elements. As an alternative the stop face device can be designed so that the engagement with the surrounding wall is provided by means of an annular element from which radially inwardly directed lugs project, said lugs constituting engagement surfaces for the end surface of the pipe end portion.

Some different embodiments of the device according to the invention shall be described in the following with reference to the accompanying drawings.

FIGS. 6–7 show modified embodiments of the pipe coupling according to FIG. 1.

Figure 1:
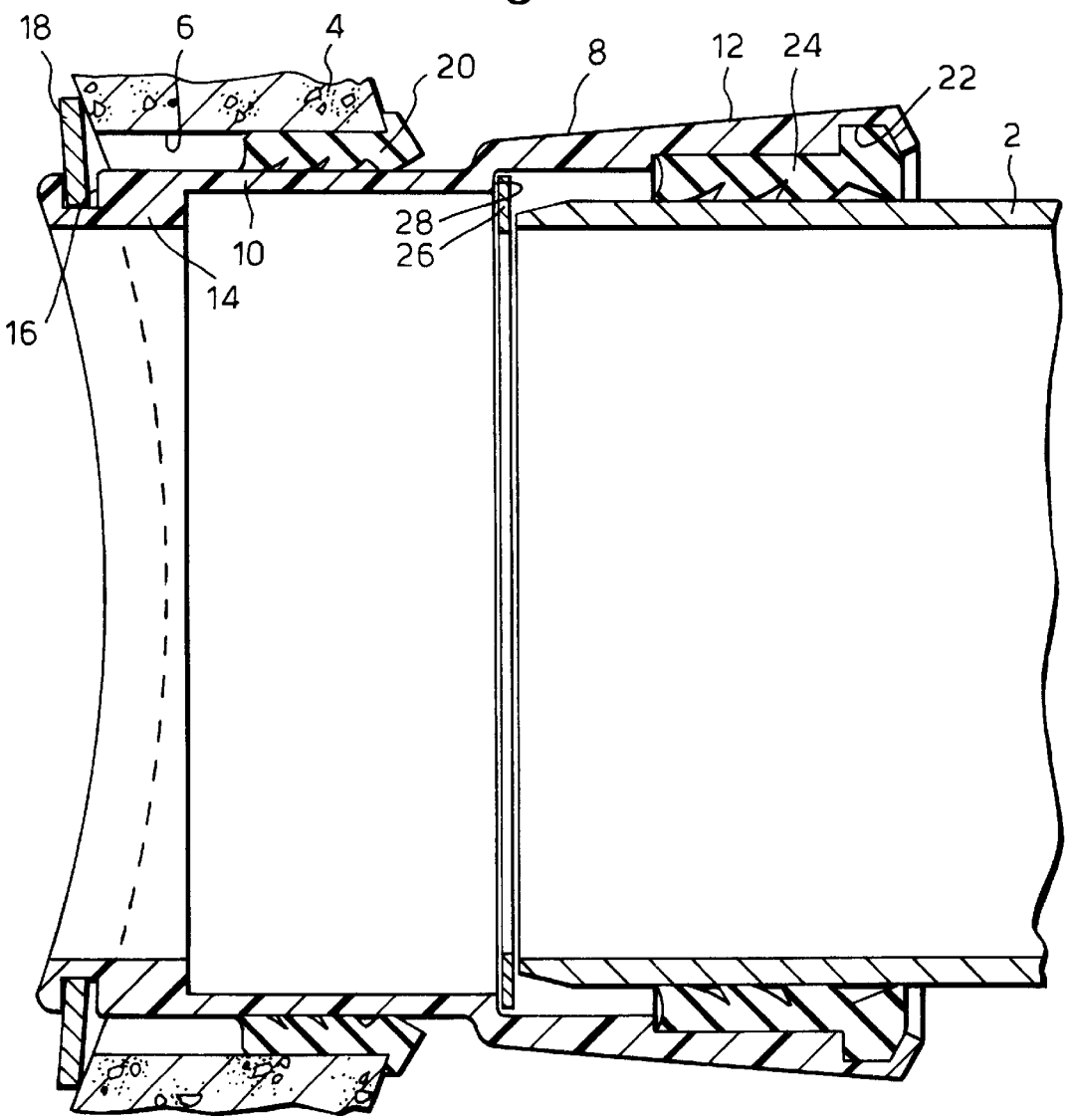
FIG. 1 is an axial section of a pipe coupling for connecting a pipe end portion with a manhole wall comprising a socket having a stop face device for defining the position of a pipe end portion in the socket.

The coupling device shown in section in FIG. 1 is intended to be used for connecting a pipe end portion 2 of a pipe line with a bore 6 formed in the wall 4 of a manhole. The coupling device comprises a sleeve 8 consisting of plastic, for example polyvinyl chloride, and having a spigot end 10 adapted to be introduced into the bore 6 in the manhole wall 4 and a socket 12 adapted to receive the pipe end portion 2. At its free end portion the spigot end 10 of the sleeve 8 has a thickened portion 14 formed with a peripherally extending groove 16 receiving the inner edge of an annular element 18. The annular element 18 is used for locking the sleeve 8 in relation to the manhole wall 4, and the thickened end portion 14 of the spigot end 10 and the groove 16 formed therein are of such a design that they adapt to the curved shape of the manhole wall 4. Preferably, the annular element 18 consists of plastic material, for example polyvinyl chloride, and is formed with a relatively wide slot in such a way that the element encloses for example only 225° of a complete circle. Thereby, the annular element 18 can be positioned in the groove 16 in substantially the same way as a Seeger locking ring, i.e. by being widened to an increased diameter and being introduced into the groove wherein it snaps into a locking position. Between the outer surface of the spigot end 10 and the surface defining the bore 6 in the manhole wall 4 there is positioned a sealing ring 20 sealing the annular space between the wall of the bore and the spigot end 10 of the sleeve 8.

The socket 12 of the sleeve 8 has an inner groove 22 receiving an annular, projecting portion of a sealing ring 24 for sealing the space between the inner surface of the socket 12 and the outer surface of the pipe end portion 2.

In the sleeve 8 there is positioned a stop face device 26 in the form of a ring contacting a shoulder 28 between the spigot end 10 and the socket 12. The ring 26 defines the relative position between the sleeve 8 and the pipe end portion 2 when this is introduced into the sleeve 8. The stop face device constituted by the ring 26 is in accordance with the invention designed so that it is inactivated after having fulfilled its object of defining the final position of the spigot end 2 in the socket 8, so that the stop face device does not prevent continuing displacement of the pipe end portion 2 into the sleeve 8. Such a displacement can be required if the pipe line to which the pipe end portion 2 is connected is subjected to ground movements. If the pipe end portion can in such a case not be further introduced into the sleeve 8 the pipe line can be subjected to damages as the manhole to which the sleeve 8 is connected is substantially firmly erected. In FIG. 1 the stop face device 26 is schematically shown as a ring, while the following FIGS. 2–5 show different embodiments of stop face devices 26 which are designed so that the stop face devices do not prevent the axial displacement of the pipe end portion 2 because of ground movements having an influence on the pipe line in which the pipe end portion 2 is included, after the stop face devices have fulfilled the object of defining the position of the pipe end portion 2.

Figure 2:
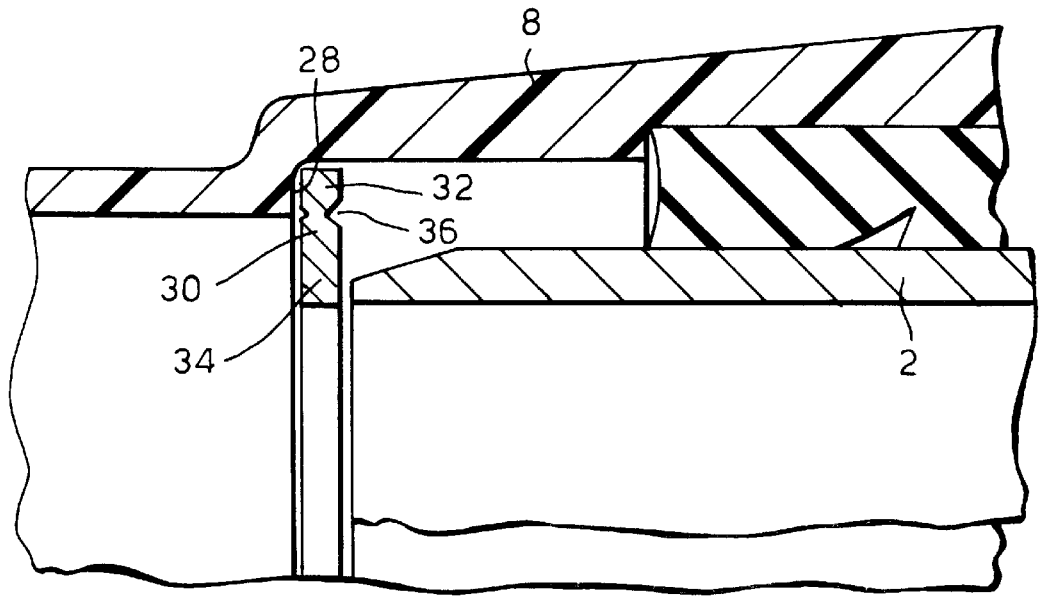
FIGS. 2–5 show different embodiments of the stop face device included in the pipe coupling according to FIG. 1 on an enlarged scale.

In accordance with FIG. 2 the stop face device 26 is constituted by a ring 30 consisting of plastic material, preferably polyvinyl chloride, and having a peripherally outer portion 32 engaging the shoulder 28 for defining the position of the ring 30 in the sleeve 8. In addition thereto the ring 30 has a peripherally inner portion 34 intended to constitute a stop face surface for the end surface of the pipe end portion 2. The elements 32 and 34 are connected with each other by means of a section weakened by means of an indication of fracture 36, and when the element 34 is subjected to an axially directed force from the pipe end portion 2, for example because of ground movements, the element 34 is folded upwards at the indication of fracture 36 in such a way that a displacement of the pipe end portion 2 into the sleeve 8 is not prevented by the ring 30. Because of the design of the ring 30 the element 34 can either be released from the element 32 or merely take an upwardly folded position against the inner surface of the sleeve 8.

Figure 3:
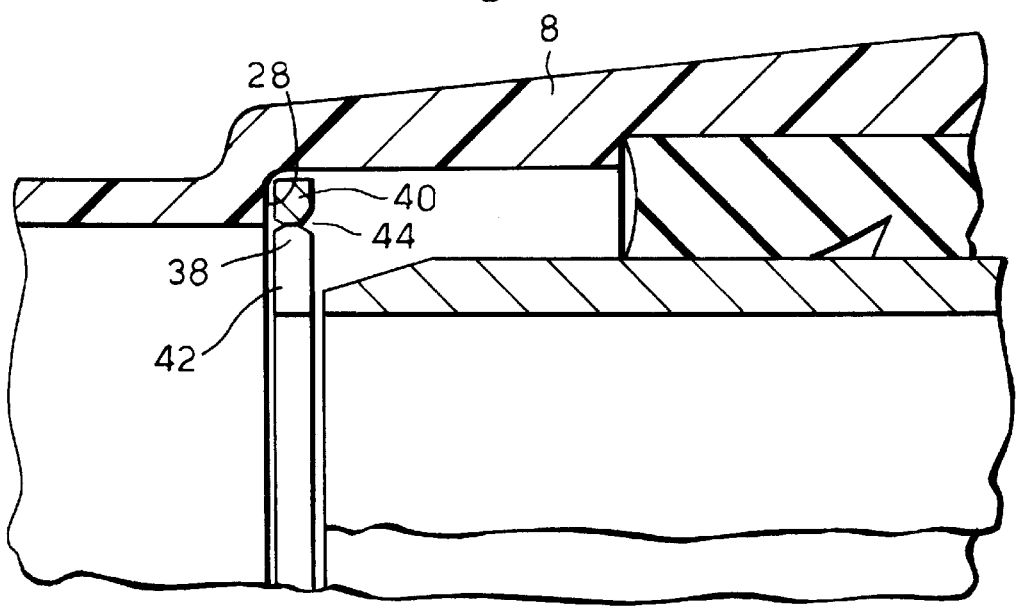

In the embodiment according to FIG. 3 the stop face device consists of a ring 38 which like the ring 30 has an annular element 40 intended to engage the shoulder 28. A number of inwardly directed lugs 42 extend from the annular element 40 and are by means of indications of fracture 44 connected with the annular element 40. The number of lugs 42 can be adapted with regard to the diameter of the sleeve 8 and the pipe end portion 2 but should at least amount to a number of four lugs. When the pipe end portion 2 is subjected to a force created by ground movements and trying to force the pipe end portion into the sleeve 8, the lugs 42 are broken or folded to a position in which they do not prevent further introduction of the pipe end portion 2 into the sleeve 8.

Figure 4:
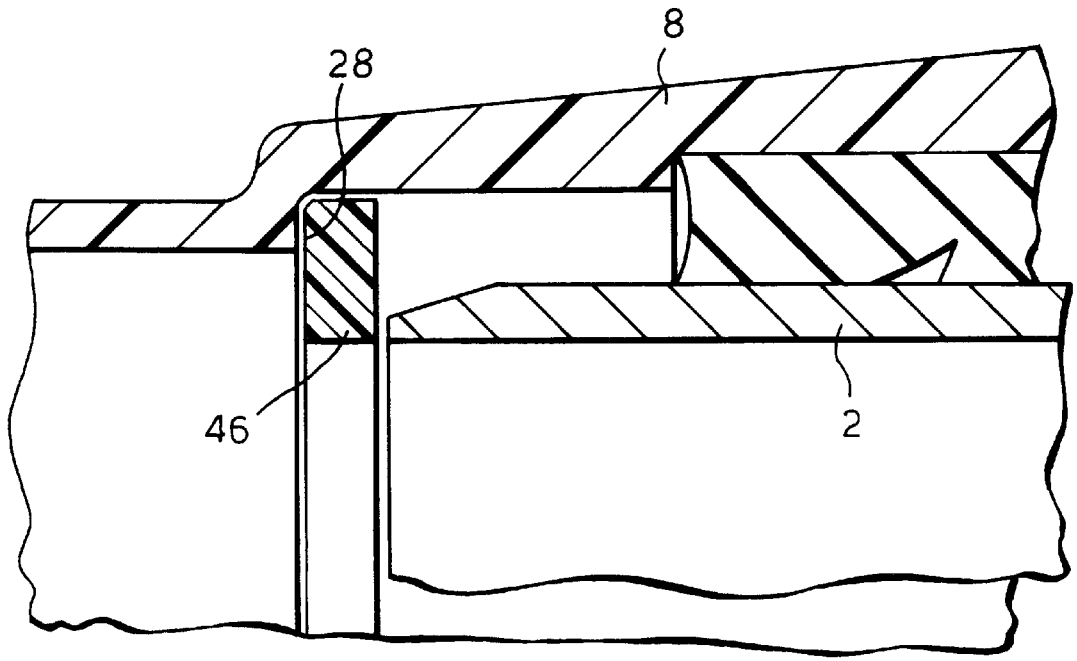

In the embodiment according to FIG. 4 the stop face device consists of a ring 46 manufactured from a brittle or easily breakable material, for example cellular plastic. Thereby, the ring 46 can be used as a stop face device for defining the position of the pipe end portion 2 when this is introduced into the sleeve 8 but does not prevent continuing displacement of the pipe end portion 2 into the sleeve when the pipe line comprising the pipe end portion 2 is subjected to forces because of ground movements.

The ring 46 can be manufactured also from a material which is degraded for example under the influence of the medium flowing through the pipe coupling. Such a material can for example be constituted by a material based on cellulose, for example cardboard, which is dissolved by water flowing through the coupling.

Figure 5:
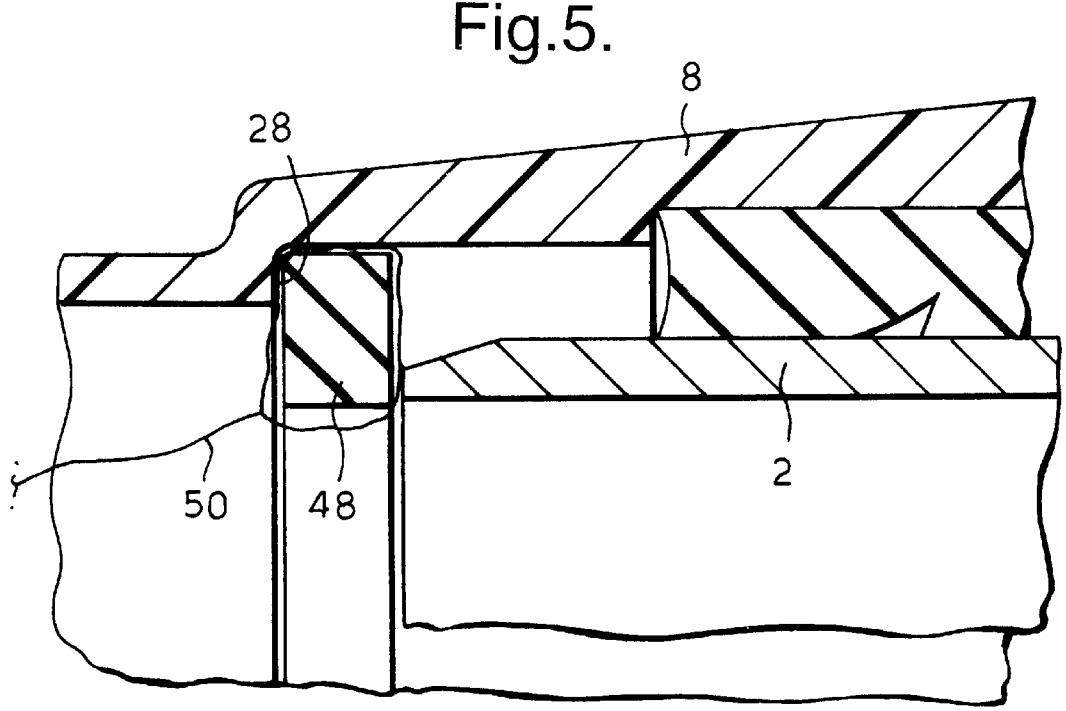

According to FIG. 5 the stop face device is constituted by a ring 48 consisting of elastic material, for example rubber. Because of the fact that the ring 48 consists of an elastic or foldable material it can be removed from the sleeve 8 after having fulfilled its function as a stop face device when the pipe end portion 2 is introduced into the sleeve 8. This can for example be provided by the fact that the ring 48 is connected to a string 50 by means of which the ring 48 can be drawn out from the sleeve 8.

FIGS. 6 and 7 show embodiments of the sleeve 8 in which the sleeve 8 has at its inner side in connection with the stop face devices elements for providing a plane inner side of the sleeve without interfering with the function of the stop face device. Thus, the space between the shoulder 28 and a shoulder 50 defining the thickened portion 14 is according to FIG. 6 filled up with a soft material 52 which for example can be constituted by foamed plastic providing the sleeve 8 with a plane inner side without interfering with the function of the stop face device. The material 52 does not either prevent that the pipe end portion 2 is displaced into the sleeve as a consequence of ground movements. According to FIG. 7 the sleeve 8 is provided with inwardly directed, annular, flexible projections 54 preventing the establishment of whirling of the medium flowing through the coupling but do in spite thereof not prevent the function of the stop face device or a displacement of the pipe end portion 2 into the sleeve 8 as a consequence of ground movements.

The invention can be modified within the scope of the following claims. It is for example possible to manufacture the stop face device unitarily with the sleeve 8.

We claim:

1. A device in a pipe coupling between a pipe end portion and a wall surrounding the pipe end portion, the pipe coupling being constituted by a socket comprising a stop face device engaging an end surface of the pipe end portion so as to define the final, fully seated position of the pipe end portion in relation to a surrounding wall of the socket when the pipe end portion is introduced therein, characterized in that the stop face device is inactivatable subsequently to defining the position of the pipe end portion in the surrounding wall; the stop face device selected from a group consisting of:

a breakable material that breaks under the influence of an axially directed force exerted thereon by the pipe end portion in response to relative movement of the pipe during use;

a flexible material that folds away under the influence of an axially directed force exerted thereon by the pipe end portion in response to relative movement of the pipe during use;

a degradable material that degrades by the influence of medium flowing through the pipe; and a stop face device that is demountable subsequently to the introduction of the pipe end portion to its final, fully seated position.

2. A device as claimed in claim 1, characterized in that the stop face device is adapted to be inactivated under the influence of an axially directed force exerted on the stop face device by movement of the surrounding wall during use.

3. A device as claimed in claim 1, characterized in that the breakable material stop face device is formed with indications of fracture.

4. A device as claimed in claim 3, characterized in that the breakable material stop face device consists of a brittle material.

5. A device as claimed in claim 4, characterized in that the stop face device consists of cellular plastic.

6. A device as claimed in claim 1, characterized in that the flexible material stop face device consists of a relatively thin sheet metal.

7. A device as claimed in claim 1, characterized in that the degradable material stop face device is constituted by cellular plastic.

8. A device as claimed in claim 1, characterized in that the flexible material stop face device partly consists of an elastic material.

9. A device as claimed in claim 1, characterized in that the flexible material stop face device consists of rubber.

10. A device as claimed in claim 9 characterized in that the stop face device is of annular shape.

11. A device as claimed in claim 10, characterized in that the stop face device comprises an annular element engaging a shoulder in the surrounding wall and foldable inwardly directed lugs connected with the annular element defining the end surface of the pipe end portion.

12. A device as claimed in claim 1, characterized in that the breakable material stop face device is of annular shape.

13. A device as claimed in claim 12, characterized in that the stop face device comprises an annular element engaging a shoulder in the surrounding wall and breakable inwardly directed lugs connected with the annular element defining the end surface of the pipe end portion.

14. A device as claimed in claim 1, characterized in that the breakable material stop face device consists of brittle material.

15. A device as claimed in claim 14, characterized in that the stop face device consists of cellular plastic.

16. A device as claimed in claim 1, characterized in that the degradable material stop face device is constituted by a material based on cellulose.

17. A device as claimed in claim 1, characterized in that the flexible material stop face device completely consists of an elastic material.

* * * * *